E. L. KENOYER.
RESILIENT WHEEL.
APPLICATION FILED MAY 8, 1914.

1,119,830.

Patented Dec. 8, 1914.
2 SHEETS—SHEET 1.

Witnesses

Inventor
Edmund L. Kenoyer.

By

Attorneys.

UNITED STATES PATENT OFFICE.

EDMUND L. KENOYER, OF SELMA, CALIFORNIA.

RESILIENT WHEEL.

1,119,830.     Specification of Letters Patent.     Patented Dec. 8, 1914.

Application filed May 8, 1914. Serial No. 837,247.

*To all whom it may concern:*

Be it known that I, EDMUND L. KENOYER, a citizen of the United States, residing at Selma, in the county of Fresno and State of California, have invented certain new and useful Improvements in Resilient Wheels, of which the following is a specification.

This invention relates to that class of resilient wheels in which metallic springs are employed as the cushioning element, whereby the necessity of a pneumatic tire is obviated.

It is the object of the invention to provide a wheel of the kind stated which is light and which rides easy, and is simple and cheap in construction. This object is attained by means of a novel combination and arrangement of parts to be hereinafter described and claimed, and in order that the invention may be better understood, reference is had to the accompanying drawings, in which—

Figure 1:
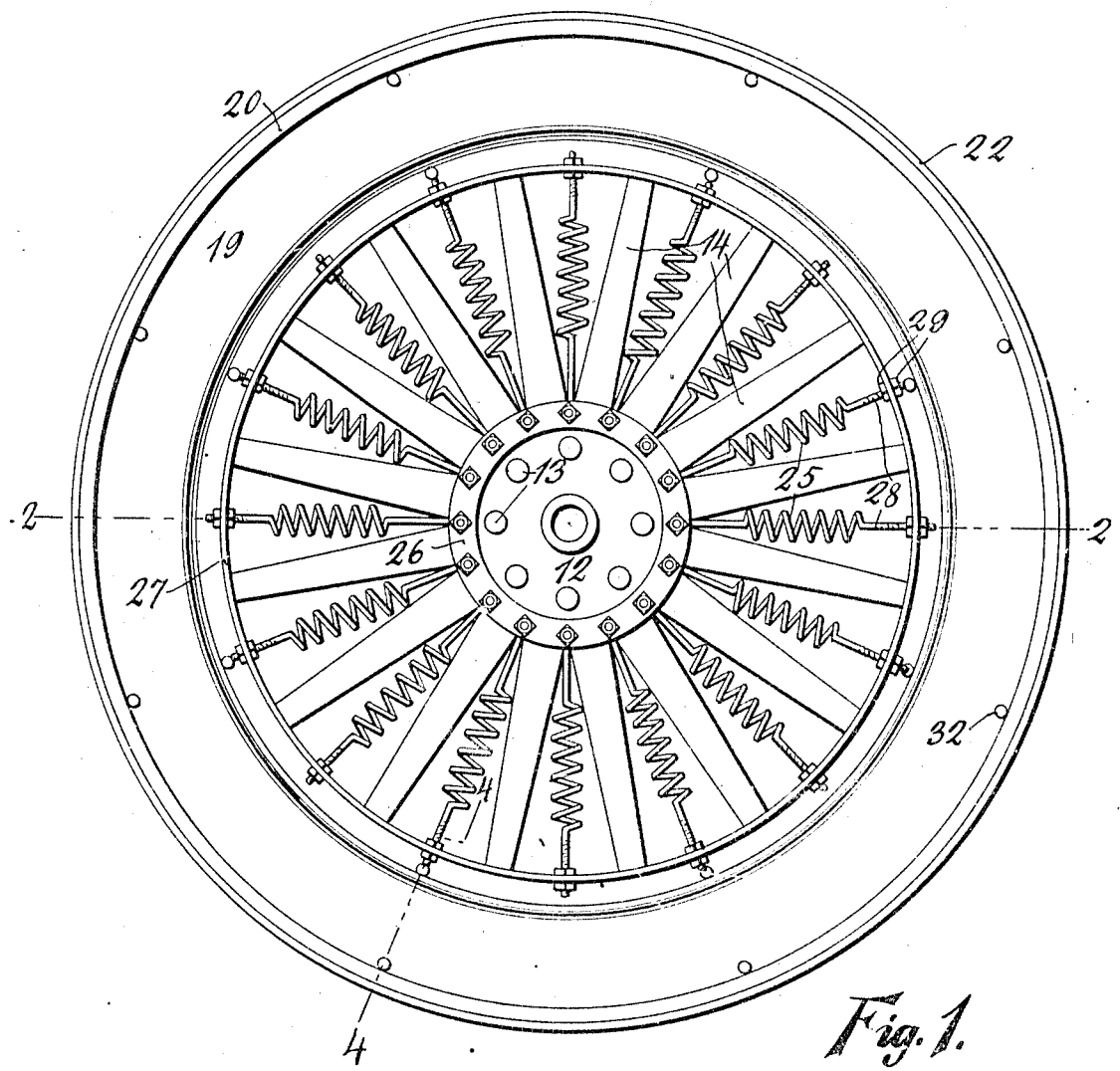
Figure 2:
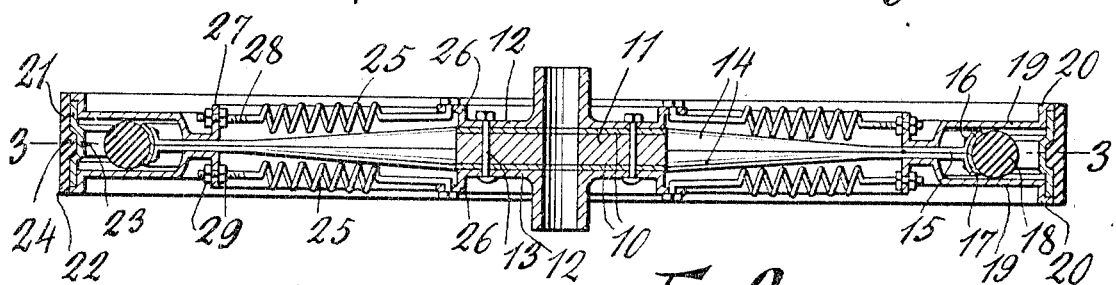
Figure 3:
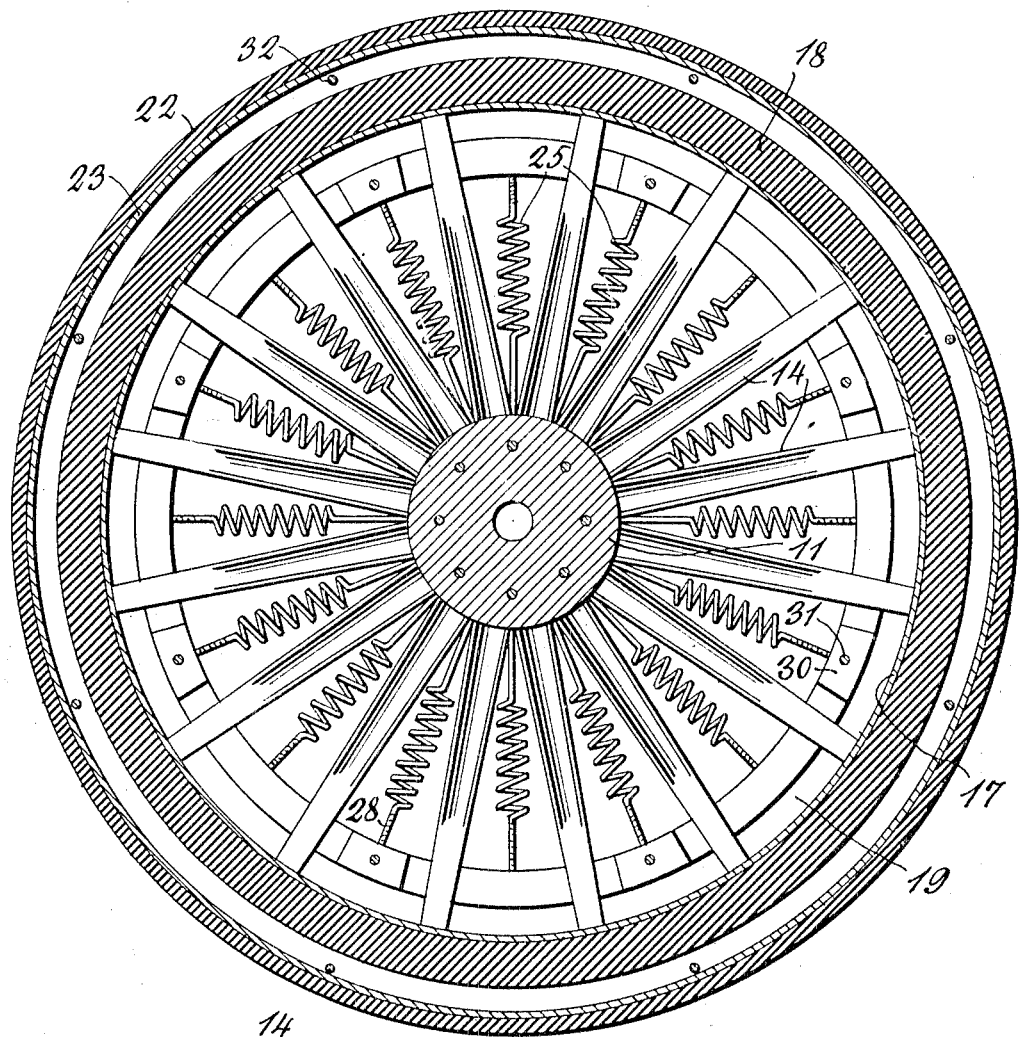
Figure 4:
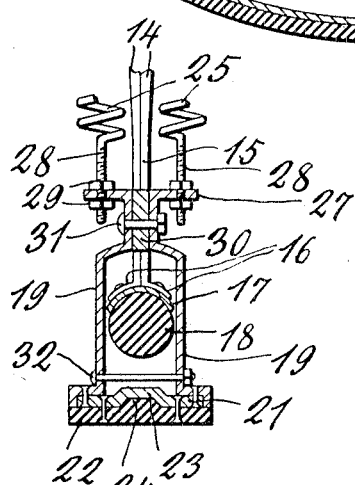

Figure 1 is a side elevation of the wheel; Fig. 2 is a section on the line 2—2 of Fig. 1; Fig. 3 is a section on the line 3—3 of Fig. 2, and Fig. 4 is a cross-section on the line 4—4 of Fig. 1.

In carrying out the present invention, there is provided a wheel having two rim portions which are held normally in concentric spaced relation by radial springs. The hub of the wheel comprises two circular metal plates or disks 10 which are bolted or otherwise fastened together with a spacing block 11 therebetween. On the outer faces of the plates fit hub caps 12. Bolts 13 passing through these parts rigidly fasten the same together to form the hub of the wheel.

The plates 10 have integral radially extending arms 14 which form the spokes of the wheel. The arms of the respective plates are opposite each other, and at their outer ends the respective opposite arms are brought together as indicated at 15 and formed with outstanding flanges 16 which serve as a seat for a rim 17 carrying a rubber tire 18. The rim 17 is secured to the flanges by being riveted thereto. Any other suitable fastening may be provided. The rim is channeled and the tire is secured thereto in any suitable manner.

The outer rim portion of the wheel comprises two laterally spaced annular side plates 19 having outstanding flanges 20 at their outer edges which are shaped to form a channel, in which latter seats a rim 21 carrying a rubber or other tread 22. The rim bridges the space between the outer portion of the plates 19 and is riveted or otherwise secured to the flanges 20. The tire is secured to the rim by copper rivets or other suitable fastening means. The rim has a central groove or channel 23 and the base of the tire has a rib 24 seating therein.

The cushioning elements of the wheel are coiled radially extending springs 25. These springs are made fast at their inner ends to outstanding marginal flanges 26 on the hub caps 12, and at their outer ends they are secured to outstanding flanges 27 at the inner ends of the plates 19. The last-mentioned ends of the springs terminate in threaded stems 28 which pass through apertures in the flanges 27, and by means of nuts 29 screwed on said stems against the flanges, the spring may be adjusted to vary the tension thereof.

The inner rim of the wheel composed of the parts 17 and 18 is located between the plates 19, which latter therefore serve as a housing for said rim. The inner portions of the side plates are held spaced apart, by spacing blocks 30, a sufficient distance to allow the outer ends of the spokes 14 to pass freely therebetween. The blocks 30 are secured by bolts 31. The outer ends of the plates 19 are also connected by transverse bolts 32.

The springs 25 hold the inner and the outer rings normally in concentric spaced relation. When the wheel is loaded the rims become eccentric by the inner rim approaching the outer rim, this movement being opposed by the springs. Whenever the jolt from the wheel dropping into a rut or meeting an obstruction is sufficient to carry the tire 18 against the band 23, said tire acts as a buffer to absorb the shock.

A wheel constructed as herein described is devoid of complicated parts liable to get out of order, it is also light and durable, and it can be easily and cheaply manufactured, and used on motor or other vehicles, as well as on bicycles and motorcycles.

I claim:

A resilient wheel comprising a hub having spaced and connected plates provided with opposite marginal flanges and radially projecting integral arms, said arms forming the spokes of the wheel, the arms of the respective plates being opposite each other and brought together at their outer ends and terminating thereat in a rim seat, a rim carried by said seat, an outer rim composed of laterally spaced annular side plates carrying a rim provided with a tread, the inner portions of the spaced plates having outstanding flanges, spacing blocks between said plates at intervals, the aforesaid spokes extending at their outer ends between the side plates and adjacent spacing blocks, and the first-mentioned rim being located between the side plates within the second-mentioned rim and spaced therefrom, and resilient connections between the flanges of the hub and the flanges of the aforesaid plates.

In testimony whereof I affix my signature in presence of two witnesses.

EDMUND L. KENOYER.

Witnesses:
  A. R. STEINWAND,
  E. E. SHEPARD.